United States Patent [19]
Sinclair

[11] Patent Number: 6,064,210
[45] Date of Patent: May 16, 2000

[54] RETRIEVABLE RESISTIVITY LOGGING SYSTEM FOR USE IN MEASUREMENT WHILE DRILLING

[75] Inventor: Paul L. Sinclair, Austin, Tex.

[73] Assignee: Cedar Bluff Group Corporation, Austin, Tex.

[21] Appl. No.: 08/969,859

[22] Filed: Nov. 14, 1997

[51] Int. Cl.[7] ............................... G01V 3/18; G01V 3/20
[52] U.S. Cl. ..................... 324/369; 324/366; 324/338
[58] Field of Search .................... 324/369, 323, 324/338–344, 355, 356, 366, 370

[56] References Cited

U.S. PATENT DOCUMENTS

| | | | |
|---|---|---|---|
| 2,364,957 | 12/1944 | Douglas | 324/356 |
| 2,568,241 | 9/1951 | Martin | 324/351 |
| 2,569,390 | 9/1951 | Sewell | 324/356 |
| 2,650,067 | 8/1953 | Martin | 324/356 |
| 3,293,542 | 12/1966 | Piety | 324/369 |
| 3,305,771 | 2/1967 | Arps | 324/342 |
| 4,496,174 | 1/1985 | McDonald et al. | 285/53 |
| 4,553,097 | 11/1985 | Clark | 324/338 |
| 4,786,874 | 11/1988 | Grosso et al. | 324/369 |
| 5,045,795 | 9/1991 | Gianzero et al. | 324/342 |
| 5,200,705 | 4/1993 | Clark et al. | 324/338 |
| 5,235,285 | 8/1993 | Clark et al. | 324/342 |
| 5,339,037 | 8/1994 | Bonner et al. | 324/366 |
| 5,463,320 | 10/1995 | Bonner et al. | 324/366 |

FOREIGN PATENT DOCUMENTS

685727  5/1964  Canada.

*Primary Examiner*—Jay Patidar
*Attorney, Agent, or Firm*—Skjerven, Morrill, MacPherson, Franklin, & Friel, L.L.P.; Stephen A. Terrile

[57] ABSTRACT

A retrievable resistivity logging system is provided for obtaining directional resistivity information while drilling (e.g., in an MWD system). The information obtained by this system can be used to determine the proximity of resistivity discontinuities and for use in steering the progress of the wellbore in the presence of geological boundaries of interest. In preferred embodiments, the logging system comprises passive transmitter and receiver electrodes built into subs that are incorporated into the drillstring, and a retrievable instrument cartridge that comprises spring loaded contacts that engage contact surfaces in the subs to connect the electrodes to the cartridge. In some embodiments, the cartridge comprises toroidal transformers coaxial to the cartridge for generating the survey current and for detecting the received current from the receive electrode. A plurality of receiver electrodes may be employed to provide simultaneous directional resistivity information from several directions around the wellbore, which may be used for detecting the presence of a nearby contrasting formation. Methods are provided for using this logging system to determine the direction and proximity of a contrasting resistivity layer, for determining apparent homogeneous resistivity of the formations surrounding the system, and for determining the dip and strike of formations intersected by the wellbore.

23 Claims, 11 Drawing Sheets

RETRIEVABLE RESISTIVITY LOGGING SYSTEM FOR USE IN MEASUREMENT WHILE DRILLING

FIELD OF THE INVENTION

This invention relates to the field of well logging, particularly for oil and gas development and exploration. More particularly, the invention provides a resistivity measuring apparatus (including a retrievable instrument cartridge) and method that is useful in measurement-while-drilling (MWD) operations.

BACKGROUND

It is well known that measurements of resistivity of subsurface formations provide useful information to engineers and geologists engaged in hydrocarbon exploration and production and other fields, such as mining. Resistivity logging is well-known in the industry. In some cases, it is performed by inducing a current to flow in the formation (and other conductive materials proximate the logging tools) and then selectively measuring the current distribution. Open-hole resistivity logging is a well-developed art, wherein the drill pipe and bit are removed from a well being drilled, and an open-hole resistivity logging tool is lowered into the wellbore and used to obtain the desired information.

Furthermore, measurement-while-drilling (MWD, also known as logging-while-drilling) systems have been developed, whereby resistivity measurements may be obtained while the drill pipe is in the hole. MWD systems permit log information, such as resistivity, to be measured in a geologic formation very soon after the formation is penetrated by the drill bit. This provides substantially "realtime" information that (a) is obtained before the formation is substantially altered by inflow of drilling fluids or other factors, and (b) may be used by the driller to control the drilling operation, for example by steering the bit so as to penetrate (or so as not to penetrate) a selected formation, which can be detected by the logging apparatus. These systems typically include transmitters and sensors disposed in or on sections of drill pipe that are located near the drill bit.

A drillstring typically comprises a bit, drill collars, and drill pipe. The lowest part of the drillstring is made up of collars. The collars are heavy walled pipe that provide weight on the bit and strength to resist buckling under their own weight. The drill pipe is thinner walled, and it is kept in tension to prevent buckling. The collars may have radial projections called stabilizers. Short drill collars, which may be adapted for specialized functions, are called "subs," and references herein to drill collars are intended to include associated subs, depending on the context of the reference, as will be appreciated by those skilled in the art.

In some prior art MWD systems, for example as described in U.S. Pat. No. 5,235,285, a toroidal transmitting transformer is built into a drill collar and it creates a current field that flows through the drillstring and the formation. Sensors, which may be in the form of buttons, rings, or toroids, are mounted in the collar and positioned to measure the magnitude of the induced current field at selected locations. The electronic components that control the transmitter and that process the received signals are located in an annular chassis that is located within the drill collar, such that the entire instrument is contained within one piece of collar pipe, which includes a continuous annular channel to allow the drilling mud to flow through it. The system includes means for communicating the collected information to the surface.

Several types of communication systems are well known in the art, including use of electrical or acoustic signals that are transmitted from a downhole transmitter to a receiver at the surface, and use of memory storage systems to record the data within the tool for retrieval when the tool is brought to the surface.

There are several problems associated with the described arrangement: (a) The system is complex, expensive and unwieldy, because all of the electronics and sensors are built into a piece of pipe that must be stout enough to support the weight placed on the bit; (b) the entire collar must be handled in order to repair any part of the system; and (c) if anything goes wrong with the system, the entire drillstring must be pulled out of the hole to gain access to it.

In U.S. Pat. No. 4,786,874, which is incorporated herein by reference, a different sort of MWD resistivity tool is described, wherein a pair of electrodes are positioned in an insulated jacket that is formed on the outside surface of a drill collar. Both electrodes are axially positioned on the same side of the collar, and they provide a directional resistivity measurement that can be used to indicate, while drilling, that the bit is approaching a boundary between high- and low-resistivity formations. The components of this system are contained in a drill collar, and an adequate annular fluid flow path is maintained to allow drilling mud to flow through the tool. This system suffers from the same deficiencies as the system discussed above, plus problems associated with the insulated jacket, which is likely to be made of a relatively soft material. The jacket, and the electrodes it supports, are exposed to hostile wellbore conditions during drilling and are likely to be severely eroded and damaged both by contact with the wellbore walls and by the flow of abrasive mud and cuttings up past the tool.

Some prior art systems have employed a cartridge or cartridge 42 is placed inside of the drilling pipe near the drill bit, the cartridge containing the electronic circuitry or instrumentation for the logging tool, or providing electrical connection between downhole components and surface equipment. The drill bit and portions of the down-hole assembly, which may be insulated, may serve as the logging electrodes. Spring contacts or brushes are typically used to provide electrical connections between such electrodes and the circuitry contained in the cartridge. In some systems, the cartridge is connected to the surface equipment by conductors, typically contained in an armored cable. See U.S. Pat. Nos. 2,596,390 and 2,650,067 (reel for cable at surface rotates with drill pipe), which are incorporated herein by reference. In other systems, the cartridge is positioned in the drillstring near the bit, and the collected data is transmitted to the surface by wireless means, such as by electrical signals (U.S. Pat. No. 2,364,957), by acoustic signals (U.S. Pat. No. 4,553,097) or by storing the data until the cartridge is retrieved from the wellbore (U.S. Pat. No. 3,293,542) (all referenced patents being incorporated herein by reference).

SUMMARY OF INVENTION

The present invention addresses the problems associated with prior MWD resistivity tools and provides an improved directional MWD resistivity tool that is relatively easy to transport, use and maintain. All of the active parts of the resistivity tool (electronics, power supply, toroidal windings, telemetry circuits, memory, etc.) are contained in a retrievable cartridge that is operatively positioned inside of a modified drill collar assembly, which comprises a drill collar, a transmitter sub, and a receiver sub. A muleshoe or other arrangement may be provided for receiving and orienting the cartridge within the drillstring in the proper position. A transmitter sub is provided that includes an insulating layer that insulates the upper or first portion of the transmitter sub, and the drillstring attached thereto, from the portion of the drillstring below insulating layer. The transmitter sub includes internal transmitter contact surfaces. The receiver sub includes an insulated directional receiver electrode and corresponding internal contact surfaces. Thus, the collar assembly is entirely passive, comprising conductive portions separated by insulating materials, the conductive portions being operably connectable to the cartridge by spring-loaded contacts or brushes in the cartridge that engage the contact surfaces of the collar assembly. An annulus is maintained between the cartridge and the collar so that drilling mud can flow through the tool and down the drillstring.

In a preferred embodiment, the customized portions of the collar assembly may be fabricated into two short subs. The upper (transmitter) sub contains the insulating layer and internal contact surfaces. The lower (receiver) sub contains the insulated, directional electrode and internal contact surfaces. One piece of conventional or customized drill collar having a selected length is positioned between the upper sub and the lower sub when the drillstring is assembled. In this way, the entire logging system (cartridge and two specialized subs) may be easily carried by a logging contractor. Alternatively, the collar and the two subs may be combined into one or more pieces of pipe having the required insulating features and contact surfaces.

The cartridge may communicate with the surface using telemetry methods known in the art, or it may store information internally for downloading when the cartridge is retrieved to the surface. The cartridge may also contain or be connected to and cooperative with other instruments, such as direction and radiation sensors and telemetry systems.

In operation, the string of drill pipe is lowered into the well, with the modified collar assembly included near the bit in the downhole assembly. At a selected time, the cartridge is lowered into place inside the drillstring using a wireline or slick line, and the line may be left in place or it may be pulled to the surface, depending on whether it is to be used for communication with the cartridge during drilling operations.

If the resistivity tool according to this invention malfunctions during drilling operations, the cartridge can be retrieved and repaired or replaced without having to pull the drillstring from the well. Because the components of this logging system that are integral to the drillstring are entirely passive it is unlikely that they will malfunction. If a wireline is used for telemetry during drilling, the cartridge can be pulled into the Kelly when it is necessary to add a joint of drill pipe without interfering with drilling operations. After the new pipe is added, the cartridge can be repositioned in the bottom-hole assembly.

In an alternative embodiment, a resistivity tool according to this invention may be provided with a plurality of directional receiver electrodes, each facing in a different direction. This enables acquisition of resistivity data from different directions around the wellbore without having to turn the drillstring as is required in the single electrode embodiment. Separate channels of receiver circuitry may be provided in the cartridge for measuring and recording the current received through each electrode, each electrode being connected to the cartridge by a separate spring-loaded contact. Methods are disclosed herein for using data obtained from a four-electrode embodiment to determine (a) the direction of a resistivity discontinuity, and (b) the apparent homogeneous resistivity of the strata surrounding the tool.

This invention therefore provides an improved system for obtaining directional resistivity data from a wellbore as it is being drilled, including an instrument cartridge that can easily be retrieved using a wireline or slick line in case of malfunction.

BRIEF DESCRIPTION OF THE FIGURES

So that the manner in which the herein described advantages and features of the present invention, as well as others which will become apparent, are attained and can be understood in detail, more particular description of the invention summarized above may be had by reference to the embodiments of the invention which are illustrated in the appended drawings, which drawings form a part of this specification.

It is noted, however, that the appended drawings illustrate only exemplary embodiments of the invention and are, therefore, not to be considered limiting of its scope, for the invention may admit to other equally effective embodiments.

DETAILED DESCRIPTION OF PREFERRED EMBODIMENTS

Figure 1:
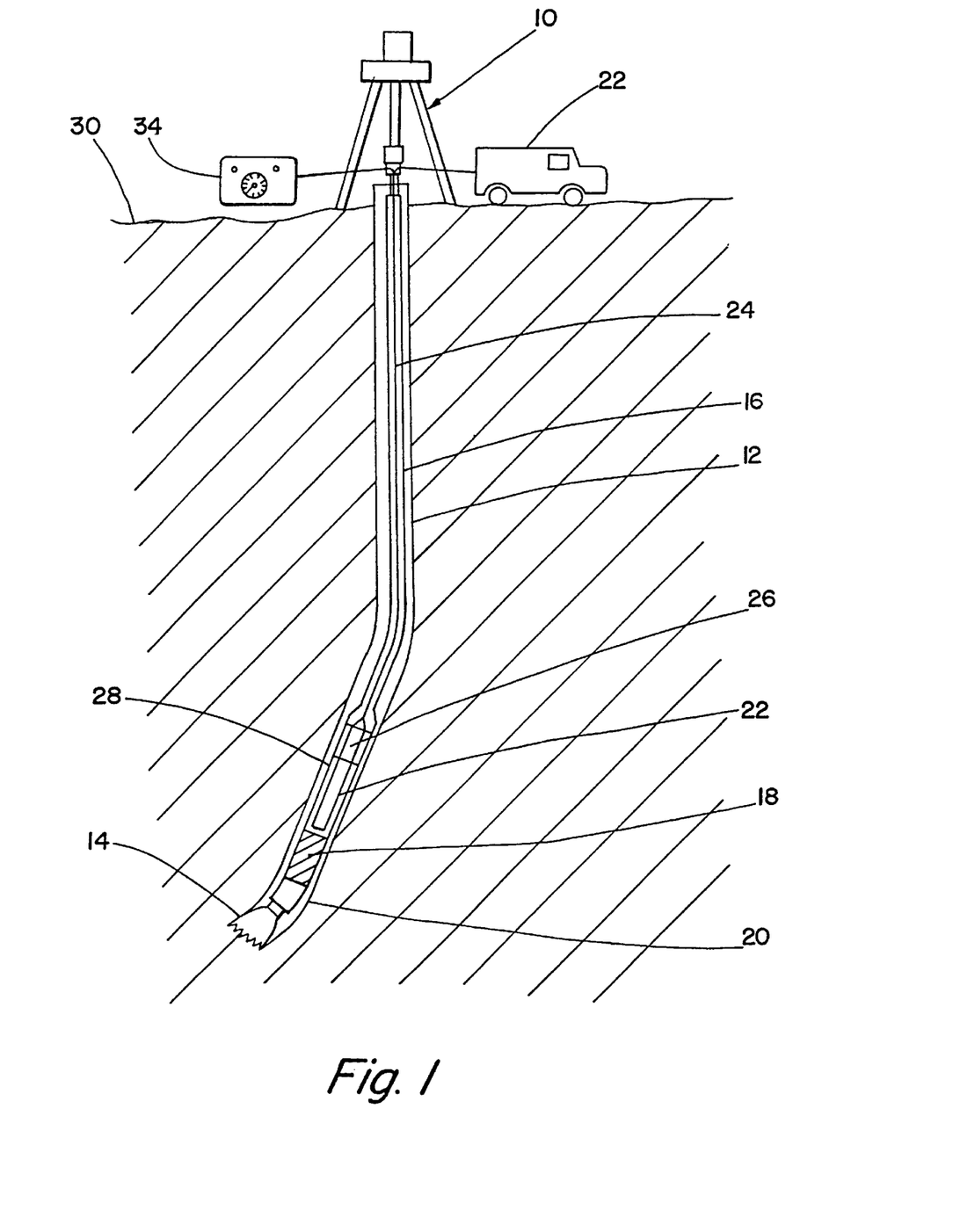
FIG. 1 schematically illustrates a typical drilling configuration utilizing a retrievable resistivity tool according to the present invention.

Referring to FIG. 1, a drilling operation typically employs drilling rig 10 to cut a borehole 12 into the earth, penetrating the various geological formations that may be present. The drilling rig is adapted to turn a drilling bit 14, which cuts through the rock at the bottom of borehole 12. Sometimes this is accomplished by attaching bit 14 to the lower end of drillstring 16 and turning drillstring 16 with powered equipment at the surface. Alternatively, as shown in FIG. 1, drill bit 14 may be driven by a down hole mud motor 18 through bent sub 20. This is commonly known as a "steering tool" system, in which drillstring 16 does not rotate to turn the bit. The drillstring 16 may be turned to cooperate with bent sub 20 to steer bit 14 so as to control the direction of advance of borehole 12, thus permitting the route of the borehole 12 to be precisely steered as desired through the subsurface geologic formations. In any event, the lower portion of the drillstring 16 is made up of heavy collars 28, which are pieces of thick-walled pipe adapted to place weight on bit 14 while keeping the upper portion of drillstring 16 in tension.

In preferred embodiments of the present invention, a resistivity logging tool 22 according to the present invention is placed in the drillstring 16 as close as possible to the drill bit 14. In a steered system, the resistivity tool may be placed above mud motor 18, receiving power and returning data to the surface through a wire line cable 24 that is passed down the center of a non-rotating (or slowly rotating) drillstring 16. In a conventional system using a rotating drillstring 16, logging tool 22 may be placed just above bit 14, and a mud pulse data telemetry system, or any other selected telemetry method, may be used to return information to the surface, as is well known in the art.

The resistivity tool 22 may incorporate or be associated with directional sensors 26 to provide directional information to the driller and to assist in controlling the steering of the drill bit, as is well known in the art. Logging tool 22 may also incorporate telemetry equipment, depending on the telemetry method that is employed in a particular application.

Above the Earth's surface 30, equipment will be positioned to receive and interpret the information generated by logging tool 22 and directional sensors 26, so that the information may be collected for later analysis or used to steer wellbore 12 into the desired position, for example to maximize recovery of hydrocarbons from a selected reservoir. Telemetry receivers and related equipment may be located in a logging truck 32 located near drilling rig 10. A data display panel 34 may be provided on or near drilling rig 10 to give the driller, engineer or geologist real-time information regarding the directional progress of the hole and the resistivities of the geologic formations near resistivity logging tool 22.

Figure 2:
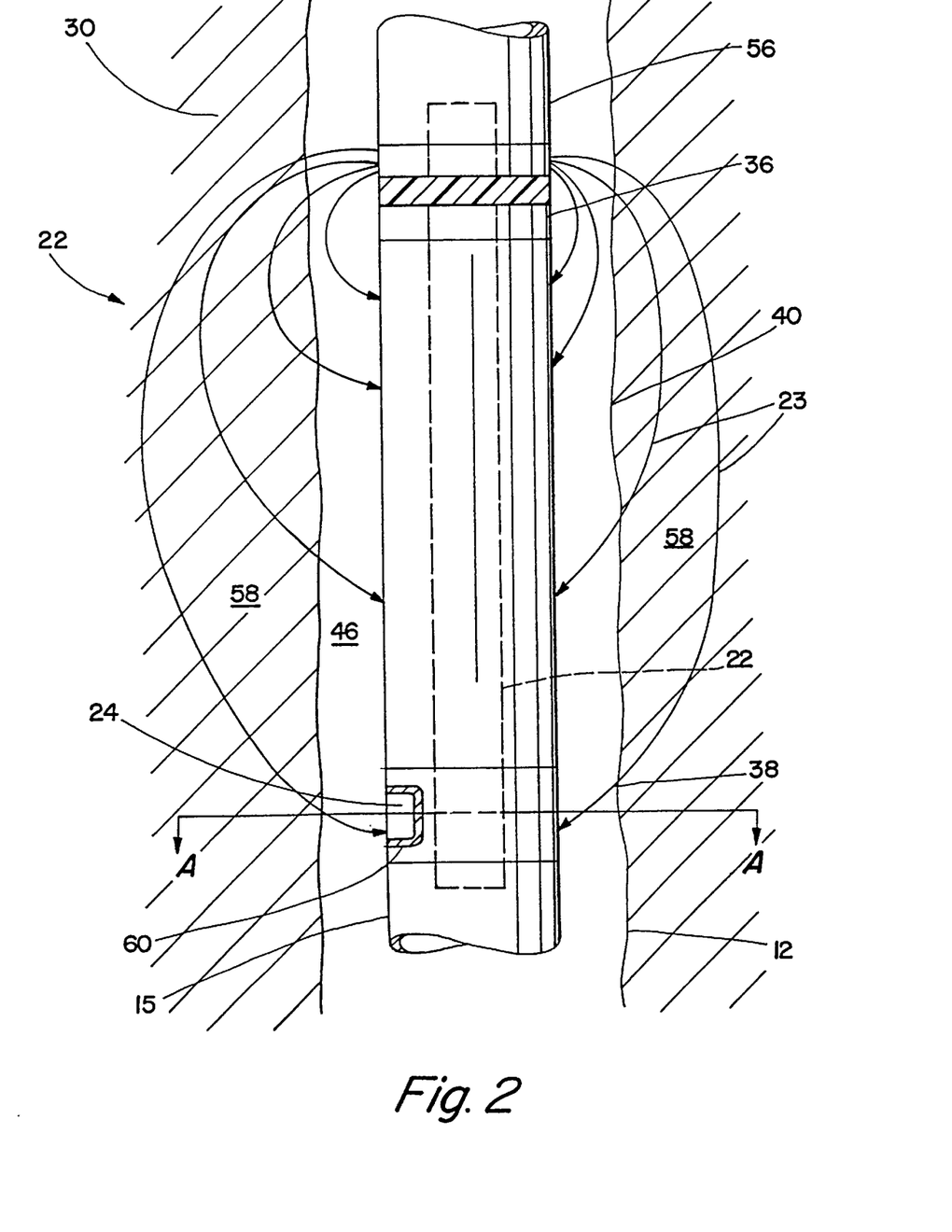
FIG. 2 is an elevation view of a preferred embodiment of the invention, showing typical current flow paths generated by the invention.

FIG. 2 illustrates a resistivity tool according to a preferred embodiment of the present invention located in borehole 12. Resistivity tool 22 is operatively positioned in borehole 12, typically with an annular space 46 between tool 22 and the borehole wall. Drilling mud fills annular space 46.

The outer parts of resistivity tool 22 comprise transmitter sub 36 and receiver sub 38, and a section of drill collar 40 with a carefully chosen length. In preferred embodiments, these external conductive components are fabricated from beryllium copper, which is non-magnetic yet provides excellent strength and conductivity, although other materials may be used within the scope of the invention. Transmitter sub 36 includes insulating layer 48 that divides a first or upper portion 50 of transmitter sub 36 from a lower or second portion 52. Insulating techniques that may be used to fabricate transmitter sub 36 are shown, for example, in U.S. Pat. No. 4,496,174 which is incorporated herein by reference.

Receiver sub 38 includes insulated electrode 54, which is electrically insulated from the remainder of sub 38 and the drillstring by insulation 60. The insulating layers in receiver sub 38 may be fabricated from PEEK® or from other suitable insulating materials known in the art. Both upper and lower subs are designed to be rugged, reliable, low cost components that have a long life in the drilling environment. The upper end of transmitter sub 36 is operatively coupled to an ordinary drill collar 56. The retrievable instrument cartridge 42 is operatively disposed interior to transmitter sub 36, collar 40 and receiver sub 38, and it is conductively connected to the first portion 50 and the second portion 52 of transmitter sub 36, and to the body of receiver sub 38, and to electrode 54. The length of the tool is related to the depth of investigation and is a matter of design choice. In presently preferred embodiments, the tool 22 is 6 to 8 feet in length, although a longer or shorter tool is within the scope of the present invention.

In operation, the resistivity tool 22 generates an electrical survey current 23 as illustrated that exits the tool above insulating layer 48, passes through surrounding rock strata 58, and returns to drill collar 40, receiver sub 38 and insulated electrode 54 that is positioned on one side of the tool. The portion of the current that is received by the electrode is sensed and quantified by electronics within the cartridge 42. That current has an inverse relationship to the rock resistivity in proximity to the electrode. The quantified electrode current information is converted to digital data and transmitted to the earth's surface by means described below.

Figure 3:
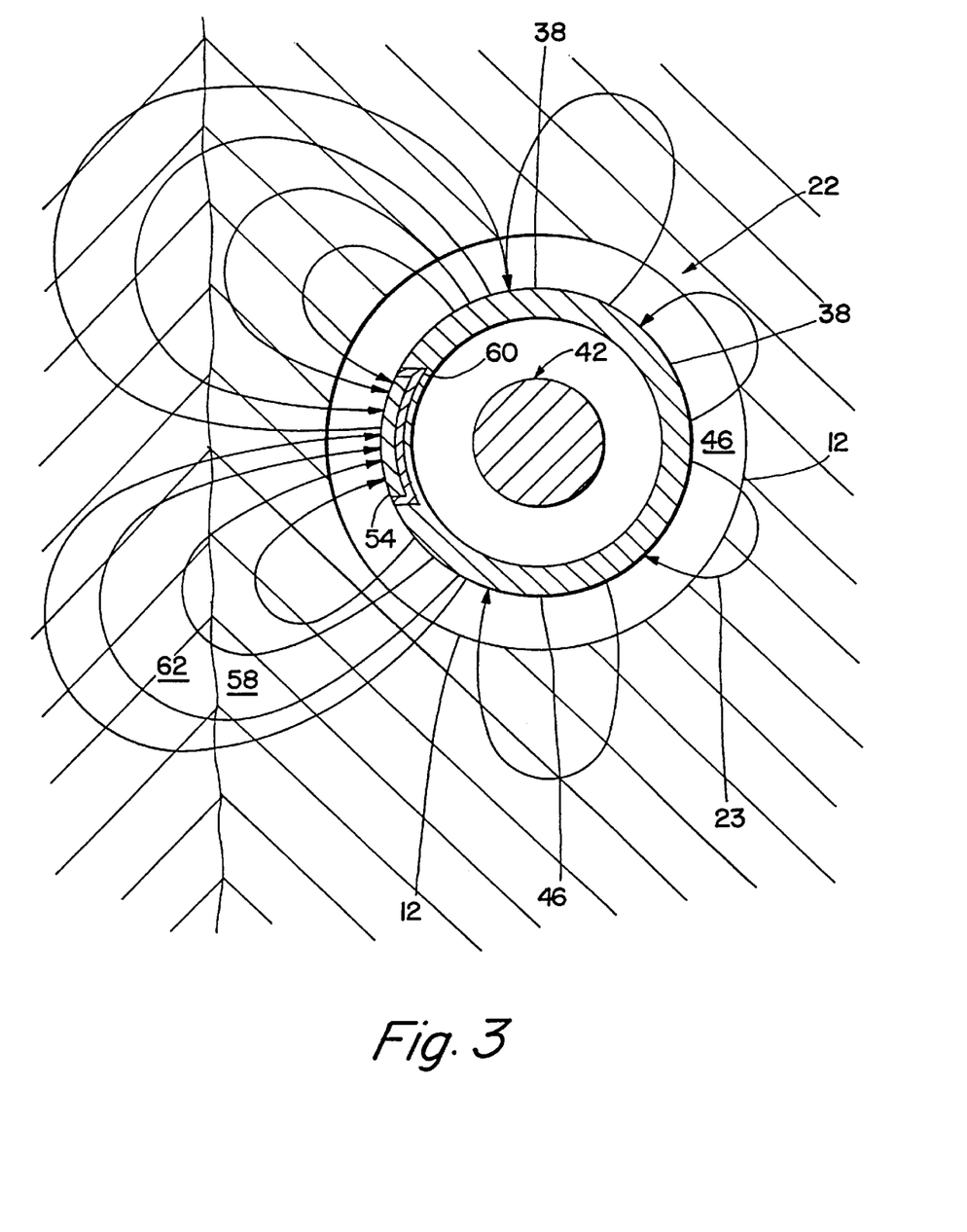
FIG. 3 is a cross-sectional plan view of the embodiment shown in FIG. 2 on cross-section 5A—5A, showing typical current flow paths generated by the invention.

FIG. 3 illustrates the operation of a preferred embodiment of resistivity tool 22 in cross section, with a highly conductive rock stratum 62 in close proximity to tool 22, whose boundary is substantially parallel to the borehole (and tool) axis. This situation commonly arises when drilling horizontal boreholes. FIG. 3 illustrates how current flows preferentially toward the conductive stratum 62, enhancing the portion of the current received by the receiver electrode 54 when the electrode faces toward the conductive rock 62. Similarly, the presence of nearby conductive strata 62 reduces the portion of the current received by electrode 54 when it faces away from the conductive rock. If the tool 22 is slowly rotated on its axis, the current received by the electrode 54 will attain a maximum and a minimum as the electrode 54 faces either toward or away from the more conductive rock 62. Thus, in combination with data from the associated directional sensors contained within the tool string, the relative location of the conductive rock stratum 62 may be determined and the drilling operation may be modified accordingly. In a horizontal well, the conductive rock 62 may be a shale cap rock overlying an oil bearing sandstone, where the purpose is to drill a borehole for a substantial distance in an oil reservoir just below the cap rock to maximize production of oil from the bore hole.

Figure 4:
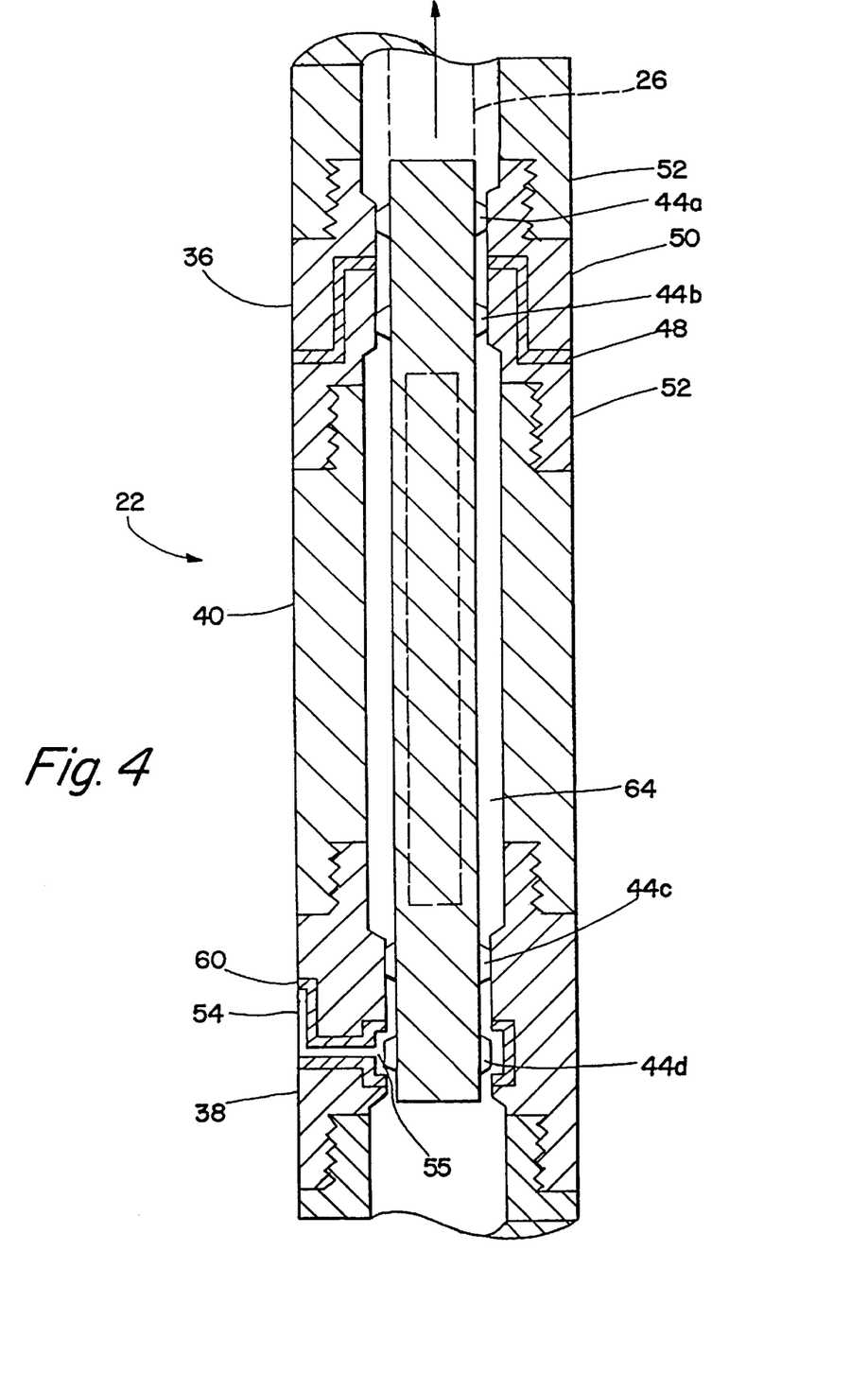
FIG. 4 is a cross-sectional elevation view of the embodiment shown in FIG. 2, illustrating the structure of the transmitter and receiver subs and the contacts between the cartridge and the subs.

Referring to FIG. 4, a retrievable resistivity tool according to the present invention may consist of four primary parts. The inner retrievable cartridge 42 contains all of the active components: the electronic circuits and data transmission circuits, along with directional sensors. Alternatively, the directional sensors may be located in another tool disposed in the drillstring. Cartridge 42 is retrievable; it may be installed or withdrawn through the drillstring using a slick line cable or wireline attached to the upper end of the tool. A muleshoe (not shown) may be used in the drillstring to accept and orient the cartridge 42 within the collars when it is installed, as is well known in the art. Cartridge 42 may optionally be operably coupled to other instruments, indicated as 26 in the figures, that may include for example direction sensors, thermal sensors, radiation sensors, and telemetry equipment. The upper end of cartridge 42 may include any of several connectors known in the art for providing electrical or mechanical connectivity with other components.

The body of cartridge 42 is preferably fabricated from beryllium copper or stainless steel, although other materials may also be employed. In preferred embodiments, cartridge 42 is approximately 1.75 inches in diameter, which allows it to be used in most standard drillstring configurations.

Transmitter sub 36 is electrically coupled to instrument cartridge 42 via spring actuated contacts 44 disposed on the upper end of cartridge 42 that are forced into engagement with a slightly reduced inside diameter of sub 36. In the illustrated embodiment, spring contacts 44a engage the first portion 50 of transmitter sub 36 above insulating layer 48, and spring contacts 44b engage the second portion 52 of transmitter sub 36 below insulating layer 48.

Receiver sub 38 includes insulated electrode 54 and uses a similar spring contacts as are used in connection with transmitter sub 36 to conduct electrode current to cartridge 42 for subsequent amplification and detection. As is illustrated in FIG. 4, spring contacts 44c engage the internal surface of the body of receiver sub 38, and spring contacts 44d engage an internal annular contact surface 55 that is conductively connected to electrode 54 and insulated from the body of the sub by insulating layer 60. As will be discussed in detail later, current is injected into the formation through contacts 44a, with return paths through contacts 44b, 44c, and 44d. The resistivity measurement that is made is based on the proportion of the return current that arrives through receiver electrode 54 and contacts 44d.

Drilling mud flows in the annulus 64 between cartridge 42 and the subs and collar 40, so the spring contacts are designed so that they do not block more than about 20% of the annulus area, and so that they are not rendered inoperable by the abrasive drilling mud that flows past them. In preferred embodiments, the contacts may be formed as bow springs, rubber fins with conductive elements, or spring loaded copper alloy fins. Beryllium copper is a preferred material for the contacts, due to its favorable properties of hardness, strength and conductivity.

Figure 5:
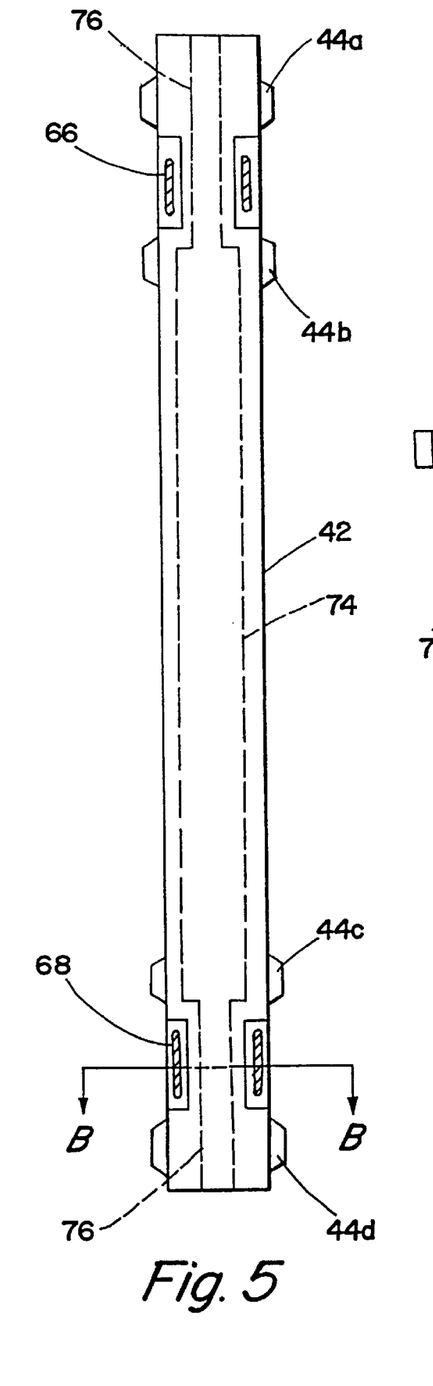
FIG. 5 is an elevation drawing of the cartridge according to the invention, showing in partial cross section the toroidal transformers that are used for creating and detecting current flow through the cartridge body.
Figure 5A:
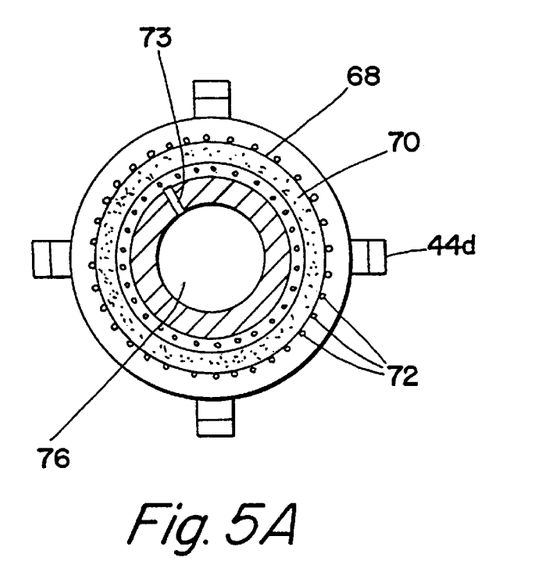
FIG. 5a is a plan illustration through cross section 5A—5A of FIG. 5.

FIG. 5 illustrates a preferred embodiment of cartridge 42 in more detail. In addition to contacts 44a–d, in preferred embodiments cartridge 42 comprises a transmitter toroidal magnetic element 66 near its upper end, between contacts 44a and 44b, as well as receiver toroidal magnetic element 68 near its lower end. Referring to FIG. 5a, which shows a cross-section view of the cartridge through section 5A—5A (FIG. 5), toroidal elements 66 and 68 each comprise a high permeability magnetic core 70 wound with a plurality of turns (typically about 100) of insulated copper wire 72 and placed in an insulated cavity around the axis of the cartridge 42. This forms an electrical transformer where the body of the cartridge 42 forms a single turn winding and the copper wire 72 is also a winding. High pressure feed-through terminals 73 connect the copper wire to electronic circuits inside cartridge 42. By this means, the very low electrical impedance of the resistivity tool outer surface (the collar and associated current sensing electrode) is transformed to a higher impedance more conveniently coupled to internal electronic circuits.

Specifically, the transmitter circuits may supply a high voltage, low current signal and the upper toroid assembly 66 will transform this signal to one with "N-times" lower voltage and "N-times" higher survey current, where "N" is the number of turns of copper wire on the toroid. Similarly, the signal intercepted by the receiver electrode 54 is a small fraction of the transmitted current at an exceedingly low voltage. Since the accurate measurement of the current received requires that there be essentially no voltage difference between the electrode and the surrounding receiver sub and collar metal, it is important that the electronic sensing circuits maintain a near zero impedance in the electrode circuit. This is best accomplished using the toroid transformer in combination with a transimpedance amplifier circuit as illustrated in the exemplary schematic of FIG. 7, which is described below.

It will be appreciated that a retrievable resistivity tool 22 according to this invention may be constructed without using the toroidal elements shown in FIG. 5, instead connecting spring contacts 44a to circuitry, which may be within cartridge 42, adapted to generate survey current. Similarly, contacts 44b, 44c and 44d may be connected to circuitry that is designed to receive and measure the return current, the toroidal transformers being replaced by conventional transformers disposed within the cartridge.

FIG. 5 also shows circuit chamber 74 within cartridge 42, in which the electronic circuitry, batteries, directional instruments, telemetry apparatus, and other selected components may be located. The electronic circuits are preferably constructed on long narrow printed circuit boards, using standard methods that are well known in the art. Channels 76 may be provided extending between circuit chamber 74 and one or both ends of cartridge 42 in order to provide conduits for wiring between circuit chamber 74 and other instruments and connectors in the drillstring.

Figure 6:
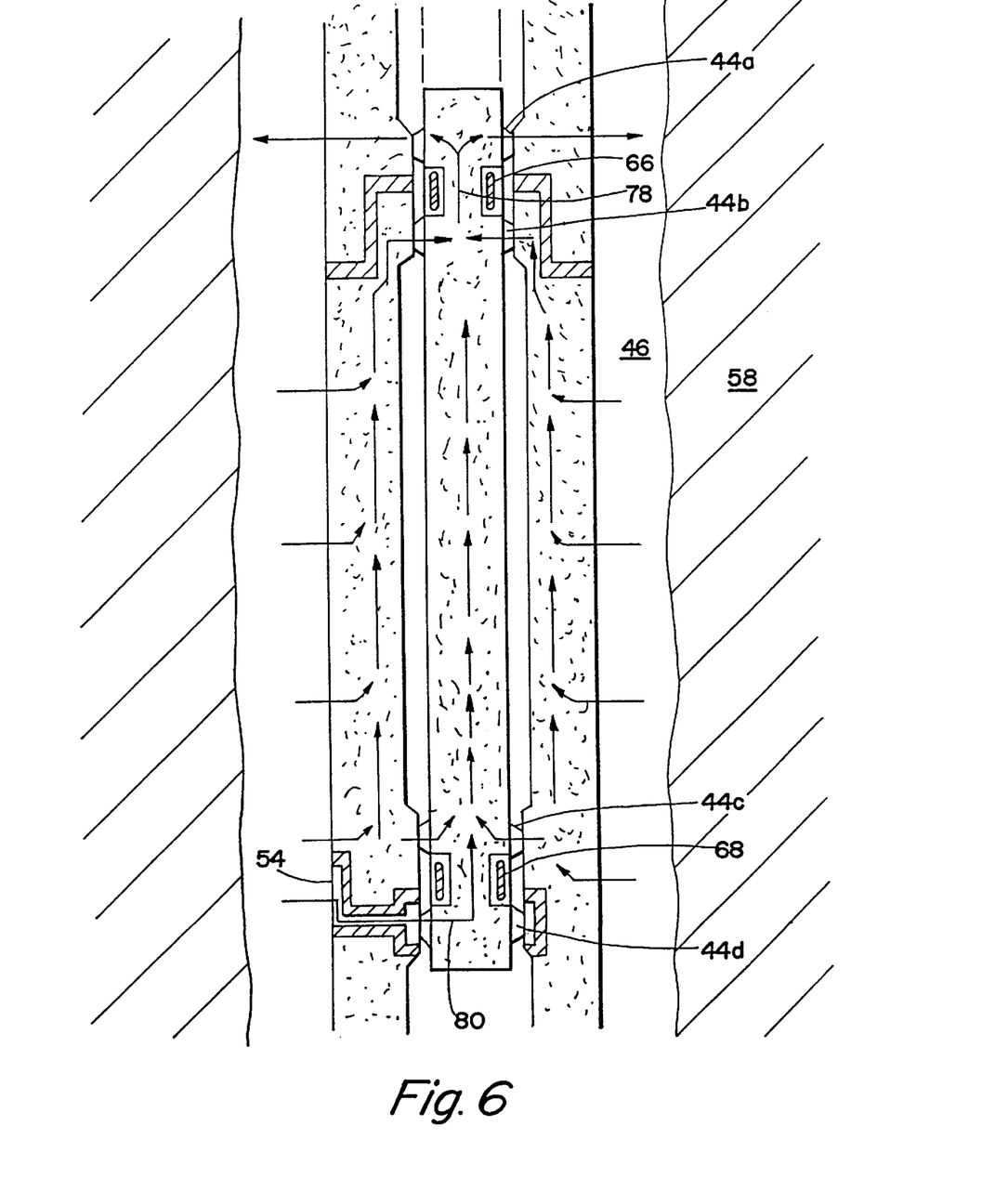
FIG. 6 is a cross-sectional elevation view of the embodiment shown in FIG. 2, illustrating the current flow paths within the collar, subs and cartridge generated during use of the invention.

FIG. 6 illustrates the current flow paths that are established during operation of a preferred embodiment of the invention. When energized, the transmitter toroidal element 66 causes a current 78 to flow through the body of cartridge 42 and out from the first contact 44a through the upper portion 50 of transmitter sub 36 above insulating layer 48 and into surrounding formation 58. Most of the current flows back into the drillstring below insulating layer 48 and back through transmitter toroidal element 66 via the second and third contacts 44b and 44c, thus completing the circuit. A portion of the returning current 80 passes through insulated electrode 54 from which it passes into the cartridge body via the fourth contact 44d, through receiver toroidal element 68, and then back to the transmitter toroidal element 66 via the cartridge body, thus completing the circuit.

The output of this directional resistivity tool corresponds to the portion of the current that returns through the insulated electrode 54, which provides a directional, quantitative indication of the resistivity of geological formations proximate the electrode. The entire assembly may be rotated in the borehole by turning the drillstring in order to scan for changes in resistivity in different directions from the borehole.

In embodiments of the invention that do not employ toroidal elements to generate and measure the survey currents flowing through the body of cartridge 42, the currents flow through signal generation and measurement circuitry located within cartridge 42, which is connected directly to spring contacts 44, rather than through the body of cartridge 42.

Figure 7:
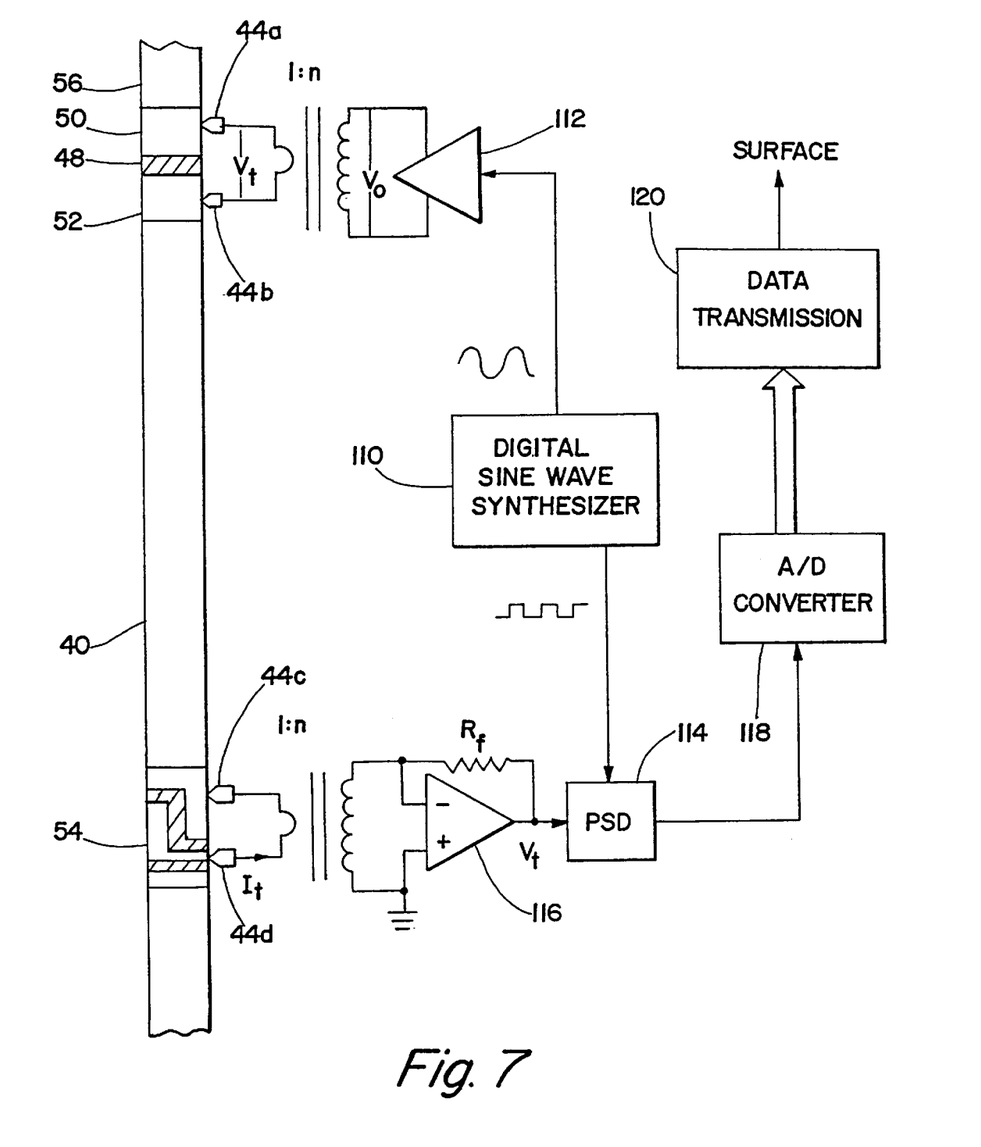
FIG. 7 is a schematic illustration of the circuitry employed in a preferred embodiment of the invention.

FIG. 7 illustrates exemplary circuitry that may be used to construct a preferred embodiment of the present invention. Oscillator 110 produces a sinusoidal wave at a frequency in the range 100 Hz–10 KHz, and an associated power amplifier 112 boosts the signal level to one appropriate for driving a survey current out from the first portion 50 of transmitter sub 36 (or via transmitter toroid 66 as previously described). The oscillator is preferably implemented as a digital sine wave synthesizer that also generates a synchronous square wave control signal for the phase sensitive detector 114 (PSD) used in the receiver channel. Circuitry may also be included to turn the transmitter "on" and "off" at a predetermined duty cycle to conserve power, as is well known in the art, particularly for battery powered implementations.

The receiver circuitry includes a transimpedance amplifier 116 that takes as input the current from receiver electrode 54, either directly from spring contact 44d or via receiver toroidal element 68 as previously described. Transimpedance amplifier 116 presents a very low impedance at its input, and it outputs a voltage corresponding to the detected current. The output from transimpedance amplifier 116 is input to phase sensitive detector 114 (PSD) that converts this sinusoidal voltage to a filtered DC voltage, as is well known in the art. An analog-to-digital (A/D) converter 118 receives the voltage output from PSD 114 and converts said voltage to a binary number representing the amplitude of the receiver electrode current. The binary number may be subsequently stored in memory located within the cartridge 42, or transmitted to the surface via wireline or mud pulse telemetry (as previously noted) for real time surface readout and storage of the data. Telemetry circuitry 120 may be provided in resistivity tool 22 for implementation of the selected mode of communication.

A quantitative indication of the resistivity of strata proximate the retrievable resistivity tool may be obtained using the data provided by the tool as described above. A precomputed tool gain factor, represented by the constant "K" in the following expression, allows calculation of the average rock resistivity (assuming homogeneous rock properties) from known values of transmitter voltage, $V_t$, and measured value of receiver current $I_r$:

apparent rock resistivity, $R_a = K \cdot V_t / I_r$

In FIG. 7, the transimpedance amplifier is shown as having a feedback gain resistor, Rf, so the output voltage due to the input current $I_r$:

$V_r = I_r \cdot R_f / n$

An exemplary measurement system would attempt to compensate for any drift in the transmitter output (such as, for example, with temperature changes) by recording the ratio between the two voltages $V_o$ and $V_r$, thus automatically correcting such drift where $V_o = n \cdot V_1$. In this case, the calculation of apparent rock resistivity may be made as follows:

$R_a = K \cdot R_f V_o / V_r \cdot n^2$

Note that $R_a$ is now defined by constants K and n, a precision resistor value $R_f$, and a voltage ratio. This results in more accurate and reliable tool operation.

Figure 10:
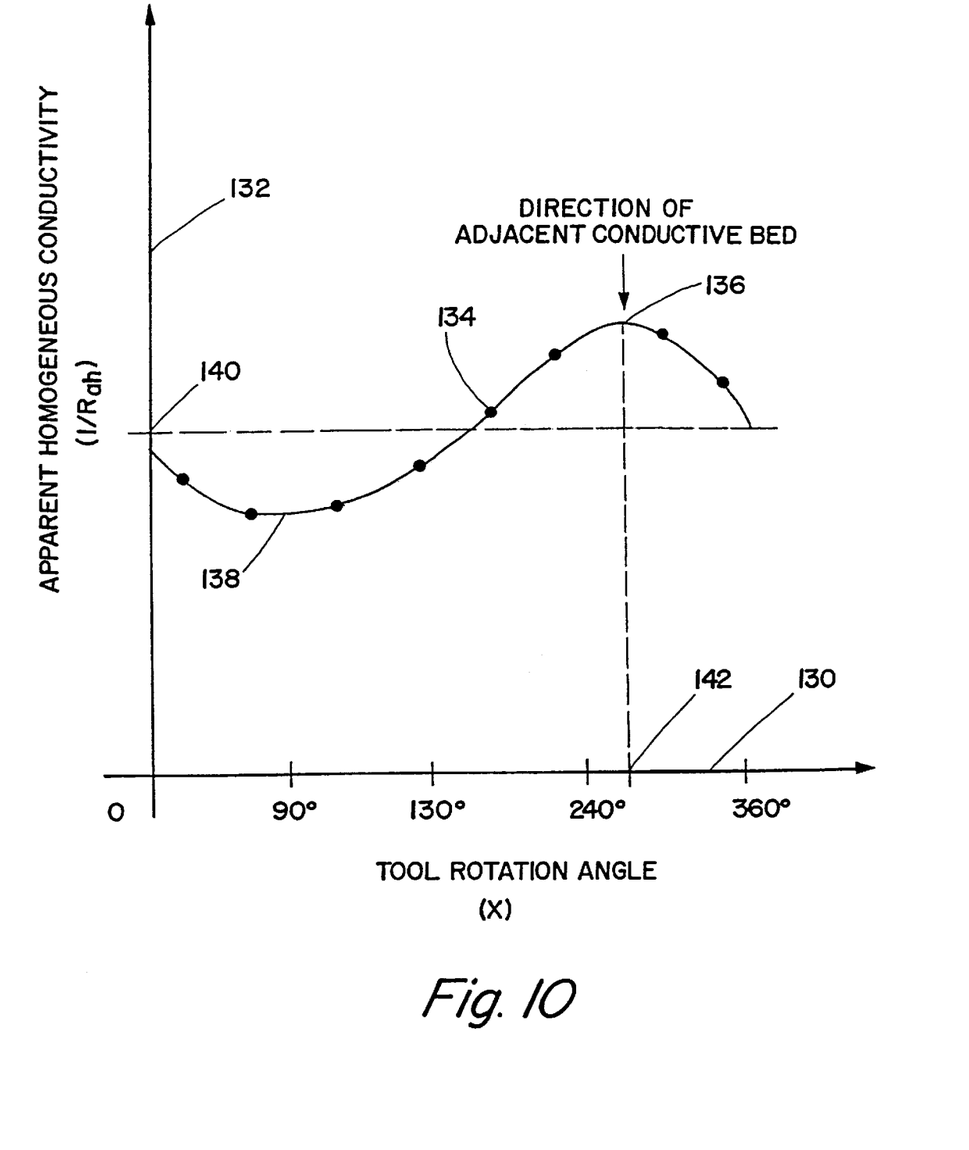
FIG. 10 is a graph showing directionally measured conductivity plotted against tool rotation angle in the presence of an adjacent conductive bed.

In the case where the rock resistivity is not homogeneous around the tool, as for example when there is an adjacent bed boundary representing a substantial discontinuity in resistivity, the apparent homogeneous resistivity value may be approximated by averaging the apparent conductivity (inverse of resistivity) values as the tool is rotated through a full 360 degrees on its own axis. For example, referring to FIG. 10, suppose that resistivity measurements are being received from the tool in the surface data recording and display equipment at a fixed rate. The tool may be slowly rotated (e.g. by turning the drillstring) so that "m" sets of data are recorded during one full rotation of the tool, as determined by the concurrent data from the directional sensors. The tool will have rotated through an angle of approximately 360/m degrees for each measurement. Then if $R_a(x)$ is the apparent resistivity calculated for each angular position x the apparent homogeneous resistivity may be calculated as follows:

$$R_{ah} = m \Big/ \sum_{x=0}^{m} [1/R_a(x)]$$

This quantity corresponds to the resistivity that would be measured by standard, omnidirectional resistivity logging methods, and it may be used for correlation with other resistivity information sources.

In order to obtain an accurate value for $R_{ah}$, m should be at least 4, and is preferably at least 8 or 10. Note that $R_{ah}$ is the apparent resistivity of the formation proximate the tool, out to the depth of investigation of the tool, and it includes the effect of resistivity discontinuities that are present within the measured volume.

FIG. 10 graphically illustrates how apparent resistivity may be determined using a directional resistivity tool in the presence of a discontinuity. Horizontal axis 130 represents the azimuthal direction of investigation when a directional measurement is obtained. Vertical axis 132 represents the measured conductivity which is the inverse of resistivity ($R_a(x)$). In the illustrated case, 8 individual measurements 134 are obtained. Due to the presence of a relatively conductive bed on one side of the tool, the plotted data exhibits a sinusoidal character, with higher conductivity measured when the directional tool faces toward the conductive bed (see 136) and lower conductivity when the tool faces away from the conductive bed (see 138). If an adequate number of samples is obtained, the apparent homogeneous conductivity 140 may be determined by averaging the individual samples. Furthermore, the azimuthal direction 142 of the conductive bed may be determined by locating the maxima 136 of the sinusoidal curve, and information concerning the distance to the conductive bed may be obtained by comparing the maxima 136 to the minima 138 of the curve.

Figure 8:
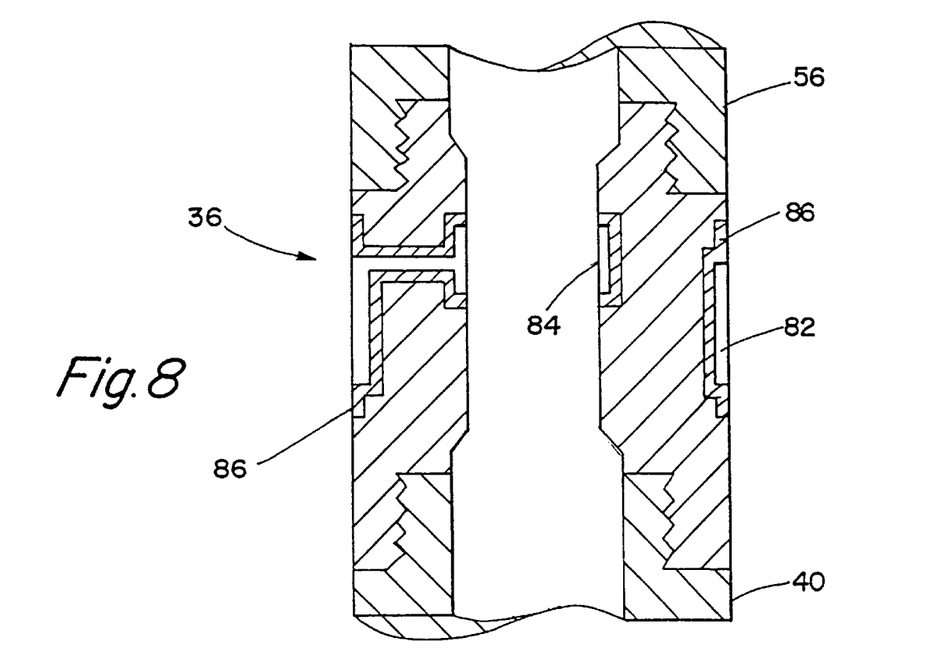
FIG. 8 is a cross sectional elevation drawing of a transmitter sub according to an alternative embodiment of the invention.

FIG. 8 shows an alternative embodiment for transmitter sub 36, wherein sub 36 comprises an isolated and electrically insulated cylindrical annular electrode 82 on the outer surface. Electrode 82 is conductively connected to an inner annular cylindrical contact surface 84 located on the inside surface of sub 36, such that instrument cartridge 42 with associated spring-loaded contacts 44 may make an effective electrical connection with electrode 82 in order to inject survey current into the surrounding formations. Electrode 82 and contact surface 84 are electrically isolated from the body of sub 36 by insulating material 86. This embodiment of the invention provides the advantage of greatly improved mechanical strength over the embodiment shown in FIG. 4, which requires a load-bearing insulating layer 48 that may be difficult to reliably manufacture. The transmitter sub 36 illustrated in FIG. 8 does, however, have the disadvantage that survey current emitted by the electrode will split into two, half returning to the drillstring below transmitter sub 36 (contributing to the resistivity measurement) and half returning to the drillstring above transmitter sub 36, where it is wasted. Thus, using the transmitter sub embodiment of FIG. 8, one half of the normal signal current will be available at the receiver electrode, resulting in a reduction of the detected signal-to-noise ratio. This is not of great concern in wireline operations or in MWD systems that generate power from a turbine downhole, since the transmitter power may simply be increased to compensate, but it may influence the design of battery-powered MWD systems.

Figure 9A:
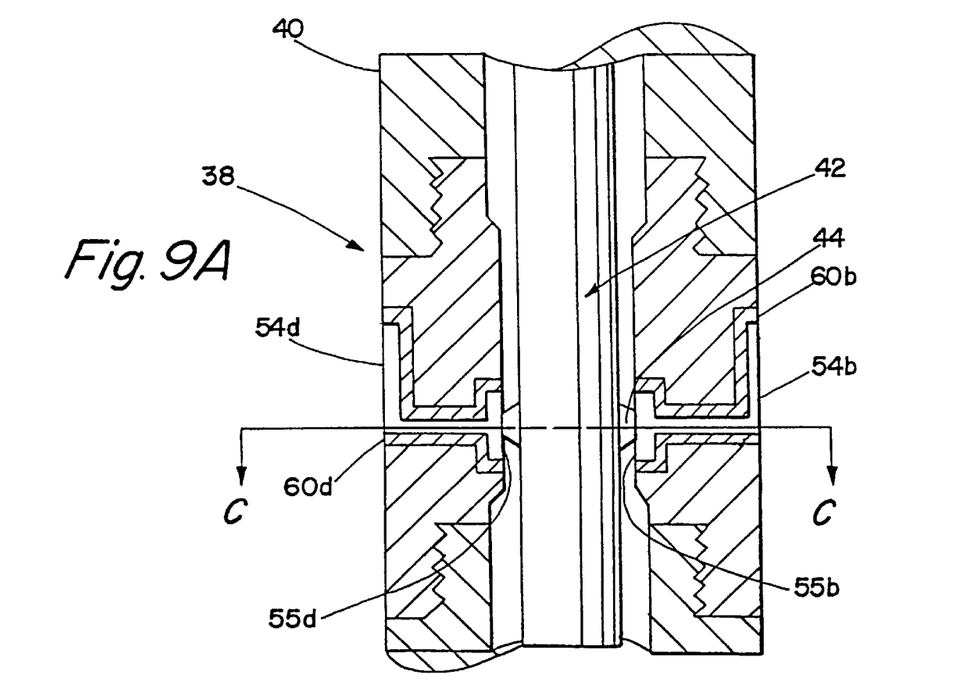
FIG. 9a is a cross sectional elevation drawing of a receiver sub according to an alternative embodiment of the invention.
Figure 9B:
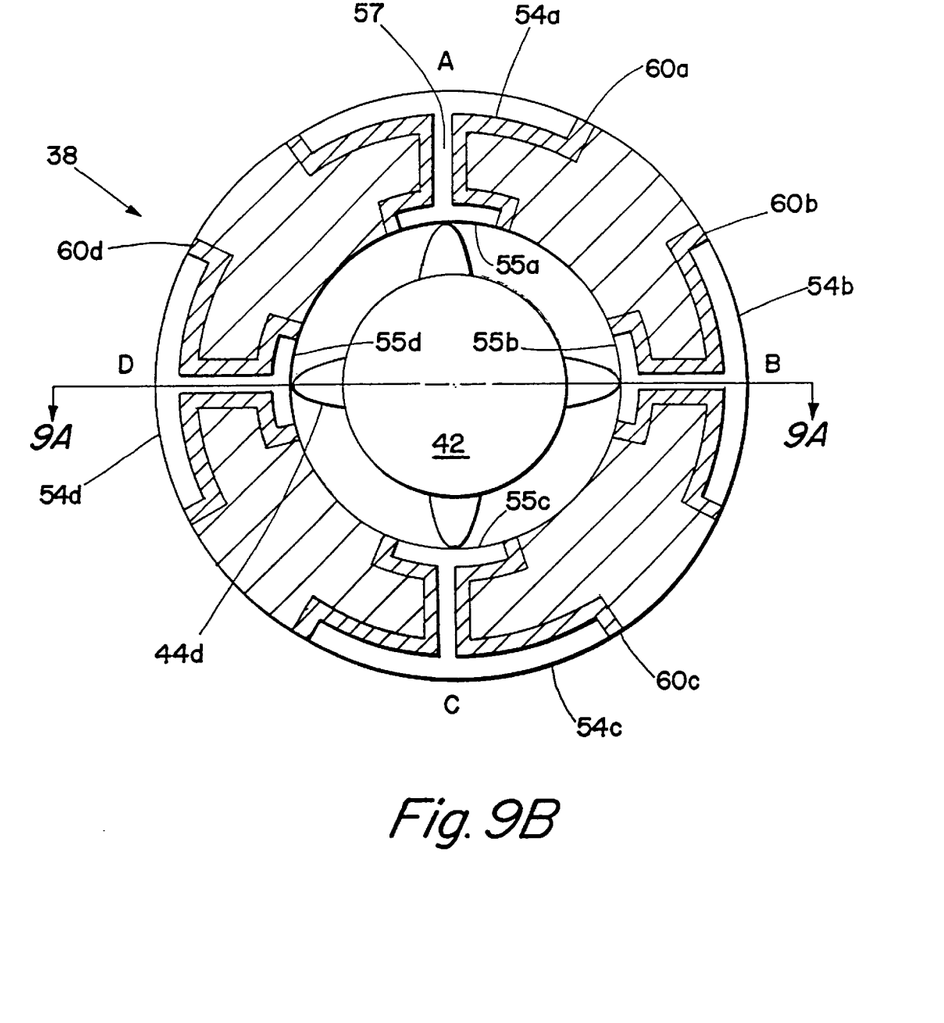
FIG. 9b is a cross sectional plan drawing of the receiver sub of FIG. 9a, through section 9B—9B.

FIGS. 9a and 9b show two cross sectional views of an alternative embodiment of receiver sub 38, wherein four electrodes 54a–54d are provided, instead of the single electrode 54 shown in FIG. 4. In this embodiment, the plurality of spring-loaded contacts 44d on the cartridge that are connectable to the receiver electrodes 54 are electrically isolated from each other, and the internal electrode contact surface 55 is split into four segments 55a–55d (each being conductively connected to one electrode 54a–54d). Insulating layers 60a–60d surround each electrode 54a–54d, its corresponding contact surface 55a–55d, and the conductive path 57 that connects them, so that four independent and electrically isolated electrode circuits are provided to the electronic sensing circuits in instrument cartridge 42. In the illustrated embodiment, there are four electrodes 54 spaced equally around the tool 22. One of skill in the art would recognize that other configurations of receiver electrodes 54 could be utilized in accordance with this invention. In this embodiment, when cartridge 42 is placed into its operative position within subs 36, 38 and collar 40, it may be rotationally aligned such that each spring-loaded contact 44 makes contact with the appropriate electrode contact surface 55, by the mechanical systems known in the art that are used to align directional sensors in MWD systems (e.g. a mule-shoe arrangement).

The multiple receiver electrode configuration provides an important advantage over the single-electrode configuration shown in FIG. 4, in that four simultaneous directionally-sensitive resistivity measurements are provided that are accurately aligned in a rotational sense with the directional gravity and magnetic-field sensors that are used to sense the spatial orientation of the drill-collar. This eliminates the need to rotate the entire drill-string (as described for the configuration of FIG. 4) to determine the direction of an adjacent bed boundary or to determine an apparent homogeneous resistivity value. This configuration simultaneously provides four measurements that are identical to those provided by a single-electrode tool when it is rotated to four angular positions 90 degrees part. Thus, the direction of a bed-boundary may be estimated (to within 90 degrees) by comparing the readings from the four electrodes and looking for a maximum or minimum resistivity value, depending on whether the adjacent bed is expected to be more or less resistive than the other rock surrounding the borehole. Apparent homogeneous resistivity may also be computed by combining the four readings using the formula previously described.

In implementing a multiple electrode configuration as shown in FIG. 9b, the circuitry of FIG. 7 may be modified by providing multiple input transformers, transimpedance amplifiers 116 and PSDs 114, one of each corresponding to each receiver electrode. The resulting PSD output voltages, one for each channel, may then be digitized and transmitted to the surface or processed further within cartridge 42.

An alternate method for calculating the direction of an adjacent rock bed of contrasting resistivity is to convert the four resistivity readings obtained using the multiple electrode receiver sub of FIGS. 9a and 9b into a vector representation of the survey current flow. Referring again to FIG. 9B, the four electrodes are labeled A, B, C, D in a clockwise rotational sense. Assume that electrode "A" is mechanically aligned with a known axis of the orientation sensors incorporated in the cartridge. If the current sensed by electrode "C" is subtracted from the current sensed by electrode "A", and similarly the current in "D" is subtracted from "B", then we may consider the resulting current differences as "X" and "Y" respectively. This process of subtraction may be achieved electronically within the cartridge circuits, using analog electronic circuits based on operational amplifiers or transformers as is well known in the art, or it may be effectively achieved digitally by subtracting the inverse of the apparent resistivities (i.e. apparent conductivities) previously calculated for each of the four electrodes, since the apparent conductivity is proportional to the electrode current. The values of "X" and "Y" now represent orthogonal vector components of the differences in survey current flow produced by the presence of an adjacent bed boundary of contrasting resistivity. These values may be positive or negative, depending on the rotational angle of orientation of the current vector relative to electrode "A", and the exact angle T between electrode A and the direction to the contrasting strata may be calculated as follows:

rotational angle, $T = \arctan(Y/X)$

Depending on the sophistication of the computing algorithms available to the user, this mathematical statement may need to be enhanced to return a value that can vary over the full −180 to +180 degree range, by examining the sign of X and Y to add or subtract 90 degrees as necessary by methods well known to those skilled in the art. It is also advisable to ensure that the absolute values of X and Y are not below a predefined threshold level determined by intrinsic noise in the measurements to return a valid answer to T and to avoid invalid computation conditions (X=0, for example). In the case of both X and Y being below the threshold, a software "flag" may be set indicating that the rock formations surrounding the borehole appear to be substantially homogeneous, and the angle computation may be omitted or ignored.

In the method described, the rotational angle T that has been computed gives the direction of an increasing variation in the survey current. Referring to FIG. 3, we see that the presence of an adjacent rock bed that is more conductive than the rock immediately surrounding the borehole produces an increase in the survey current intercepted by a receiver electrode that is facing toward the more conductive rock bed. If the adjacent bed were less conductive than the rock around the borehole, then the electrode current in the proximate electrode is decreased. This situation is indistinguishable from the case of a more conductive bed on the opposite side of the borehole, so it is important to know in advance the relative value of the contrasting rock resistivity. Fortunately, this information is readily available in most drilling situations where steering operations are performed because resistivity logs from offset wells or other archival geological information are usually available for correlation and comparison.

Figure 11:
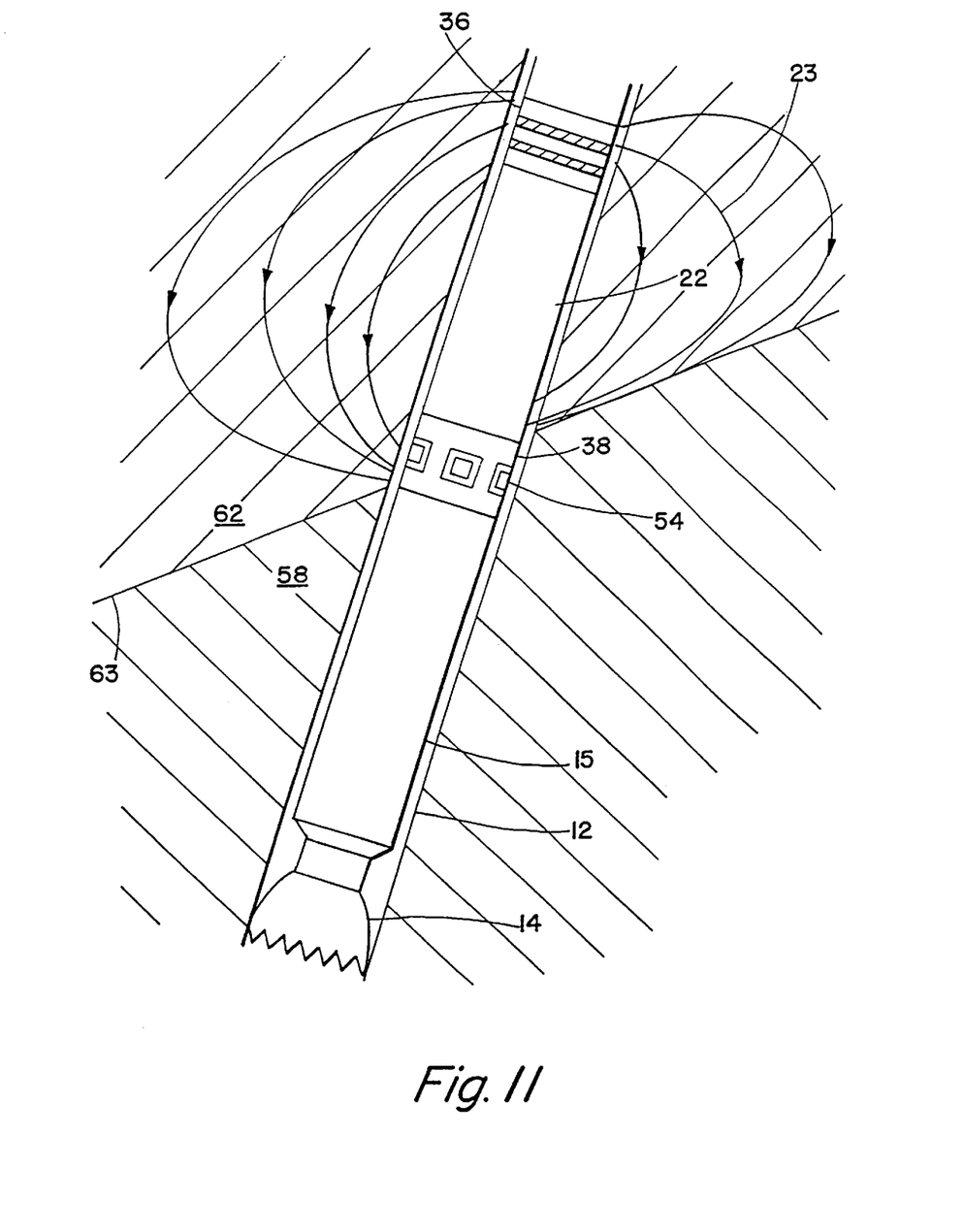
FIG. 11 illustrates the application of a logging tool in accordance with the present invention as a dipmeter.

An embodiment of the present invention employing a multi-electrode receiver as illustrated in FIGS. 9A and 9B may be employed to determine the dip and strike angle of rock bed boundaries penetrated by the borehole during drilling. Referring to FIG. 11, a borehole 12 will typically pass through boundaries 63 between more conductive rock 62 and less conductive rock 58. For example, oil bearing reservoir rock is often less conductive than the overlying impermeable layer. As the receiver sub 38 passes non-orthogonally through boundary 63, each of the plurality of electrodes will detect changes in apparent resistivity at different distances along the borehole, dependent upon the dip and strike angles of the boundary and the directional orientation of the axis of the borehole and the logging tool. For example, FIG. 10 shows that a receiver electrode that is still within a more conductive layer will receive a higher survey current than will an electrode that has passed into the less conductive layer. The resistivity measured by each receiver electrode may be recorded as a function of distance along the borehole, and the resistivity data may then be cross-correlated and combined with position and orientation data to calculate the dip and strike angles of the bed boundary relative to true vertical and the earth's magnetic field, as will be apparent to one skilled in the art.

The resulting dip and strike data is valuable to the driller, particularly during a transition from vertical to horizontal drilling operations, because it can indicate if the boundaries of a reservoir formation have a natural slope that should be taken into consideration during horizontal geosteering drilling operations.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size and arrangement of parts. For example, equivalent elements may be substituted for those illustrated and described herein, and certain features of the invention may be utilized independently of the use of other features, all as would be apparent to one skilled in the art after having the benefit of this description of the invention.

What is claimed is:

1. A resistivity logging system for use in measurement while drilling operations wherein the logging system is located in a down-hole assembly near a drill bit while a well is being drilled, the logging system comprising:

a drill collar having a selected length;

a transmitter sub connected to one end of the drill collar, the transmitter sub
having an insulating layer that electrically isolates a first portion of the transmitter sub from a second portion of the transmitter sub, wherein the first portion of the transmitter sub includes a first conductive material on a first inner annular surface of the first portion, and the second portion of the transmitter sub includes a second conductive material disposed on a second inner annular surface of the second portion;

a receiver sub connected to a second end of the drill collar, the receiver sub
including at least one receiver electrode disposed over a selected portion of an outer annular surface of the receiver sub and at least one receiver electrode contact disposed on a selected portion of an inner annular surface of the receiver sub, the at least one receiver electrode coupled to the at least one receiver electrode contact via a conductive material disposed in the receiver sub, the conductive material being surrounded with insulating material;

an instrument cartridge having a conductive body positionable within the drill collar and subs, the cartridge including:
at least a first electrical contact for
conductively coupling with the conductive material disposed on the first inner annular surface of the transmitter sub;
at least a second electrical contact for conductively coupling with the conductive material disposed on the second inner annular surface of the transmitter sub;
at least a third electrical contact for conductively coupling with the at least one receiver electrode contact;
at least a fourth electrical contact for conductively coupling with a portion of the inner annular surface of the receiver sub that is independent of the conductive material and the insulating material; and
current injection circuitry connected to inject current into the formation
through the first electrical contact and current sensing circuitry connected to sense the current returned through the third electrical contact.

2. The logging system of claim 1, further comprising signal processing circuitry for providing processed signal data corresponding to the magnitude of the sensed current.

3. The logging system of claim 2, wherein the signal processing circuitry includes an analog-to digital converter, and wherein the processed signal data is provided in a digitized format.

4. The logging system of claim 1, further comprising a wireline telemetry system.

5. The logging system of claim 1, further comprising a mud pulse telemetry system.

6. The logging system of claim 1 wherein said drill collar, said first conductive material disposed on the first inner annular surface, and said second conductive material disposed on the second inner annular surface predominantly comprise beryllium copper.

7. The logging system of claim 1, wherein the at least one receiver electrode and the at least one receiver electrode contact predominantly comprise beryllium copper.

8. The logging system of claim 1, wherein the receiver sub includes a plurality of receiver electrodes and a corresponding plurality of receiver electrode contacts.

9. The logging system of claim 1, wherein said current injection circuitry includes a toroidal coil transmitting transformer mounted coaxially on the cartridge between the first electrical contact and the second electrical contact, the transmitting transformer having windings connected to receive a preselected transmit signal.

10. The logging system of claim 1, wherein said current sensing circuitry includes a toroidal coil receiving transformer mounted coaxially on the cartridge between the third electrical contact and the fourth electrical contact such that current from the at least one receiver electrode passes through the receiving transformer, the receiving transformer having windings connected to signal processing circuitry in the cartridge.

11. The logging system of claim 1, wherein the first portion of the transmitter sub and the second portion of the transmitter sub are separated by an insulating layer that extends across the diameter of the transmitter sub, such that one end of the transmitter sub is in said first portion, and the other end of the transmitter sub is in the second portion.

12. A resistivity logging system for use in a measurement while drilling operation, wherein the logging system is located in a drillstring proximate a bit, the logging system comprising:

a transmitter sub for attaching to a drill collar, the transmitter sub including a
transmitting electrode located on an external surface of the transmitter sub and electrically coupled via conductive material surrounded by insulating material to conductive material contact disposed on an internal annular surface of the transmitter sub;

a receiver sub for attaching to the drill collar, the receiver sub including at least
one directional receiving electrode located on an external surface of the receiver sub and electrically coupled via conductive material surrounded by insulating material to an electrical receiver contact located on an internal annular surface of the receiver sub;

a retrievable instrument cartridge having a conductive body positionable within
the drill collar, the transmitter sub and the receiver sub, the cartridge including:
at least one electrical contact for conductively coupling with the
transmitting electrode of the transmitter sub;
at least a second electrical contact for conductively coupling with the
receiving electrode of the receiver sub;
current injection circuitry for injecting current into the formation through
the transmitter sub; and
current sensing circuitry for sensing the current received through the
receiver sub.

13. The resistivity logging system of claim 12, wherein the insulating layer separates a lower portion of the transmitter sub from an upper portion of the transmitter sub.

14. The resistivity logging system of claim 12, wherein the cartridge includes a toroidal coil transmitting transformer mounted coaxially on the cartridge.

15. The resistivity logging system of claim 12, wherein the cartridge includes a toroidal coil receiving transformer mounted coaxially on the cartridge.

16. The logging system of claim 12, wherein the logging system includes a plurality of receiver electrodes and a corresponding plurality of receiver electrode contacts.

17. The logging system of claim 12, wherein the instrument cartridge includes an analog to digital converter.

18. The logging system of claim 12, wherein the instrument cartridge includes a transimpedance amplifier.

19. The logging system of claim 12, wherein the retrievable instrument cartridge includes a phase sensitive detector.

20. The logging system of claim 12, wherein the retrievable instrument cartridge includes integrated direction sensing apparatus.

21. The logging system of claim 12, further comprising direction sensing apparatus contained within said retrievable instrument cartridge, the direction sensing apparatus generating directional resistivity data.

22. The logging system of claim 21, further comprising means for transmitting directional resistivity data to the surface.

23. The logging system of claim 22, further comprising means for displaying the directional resistivity data to an operator at the surface.

* * * * *